United States Patent
Nakamura et al.

(10) Patent No.: US 7,355,305 B2
(45) Date of Patent: Apr. 8, 2008

(54) SMALL-SIZE DIRECT-ACTING ACTUATOR

(75) Inventors: Hajime Nakamura, Takefu (JP);
Takehisa Minowa, Takefu (JP)

(73) Assignee: Shen-Etsu Chemical Co., Ltd., Tokyo (JP)

(*) Notice: Subject to any disclaimer, the term of this patent is extended or adjusted under 35 U.S.C. 154(b) by 423 days.

(21) Appl. No.: 11/004,859

(22) Filed: Dec. 7, 2004

(65) Prior Publication Data

US 2005/0121984 A1 Jun. 9, 2005

(30) Foreign Application Priority Data

Dec. 8, 2003 (JP) ............................. 2003-408859

(51) Int. Cl.
*G11B 21/10* (2006.01)
*G11B 21/21* (2006.01)

(52) U.S. Cl. ......................... 310/12; 310/21; 310/36; 360/294.3

(58) Field of Classification Search .................. 310/12, 310/15, 21, 36; 360/294.3–294.6, 78.12
See application file for complete search history.

(56) References Cited

U.S. PATENT DOCUMENTS

| | | | |
|---|---|---|---|
| 5,893,283 A * | 4/1999 | Evans et al. ............... | 70/303 A |
| 6,317,277 B1 | 11/2001 | Izumino et al. | |
| 6,414,823 B1 * | 7/2002 | Crane et al. ............... | 360/294.5 |
| 6,583,524 B2 * | 6/2003 | Brandt ........................ | 310/12 |
| 6,879,468 B2 * | 4/2005 | Nakamura et al. ........ | 360/294.1 |
| 6,927,945 B2 * | 8/2005 | Yao et al. .................. | 360/294.3 |
| 7,006,332 B2 * | 2/2006 | Nakamura et al. ........ | 360/294.3 |
| 2004/0130830 A1 * | 7/2004 | Nakamura et al. ........ | 360/294.3 |
| 2004/0130832 A1 * | 7/2004 | Nakamura et al. ........ | 360/294.5 |
| 2005/0121984 A1 * | 6/2005 | Nakamura et al. ............ | 310/12 |
| 2005/0122629 A1 * | 6/2005 | Nakamura et al. ........ | 360/264.7 |

FOREIGN PATENT DOCUMENTS

DE     10225024 A1 * 12/2003
EP      1091477 A2    4/2001

(Continued)

OTHER PUBLICATIONS

Wakiwaka et al., Journal of the Magnetics Society of Japan, vol. 24, No. 4-2, (2000), pp. 955-958.

(Continued)

*Primary Examiner*—Karl Tamai
(74) *Attorney, Agent, or Firm*—Birch, Stewart, Kolasch & Birch, LLP

(57) ABSTRACT

A direct-acting actuator is provided comprising a stator section (16), an attachment section (6) secured to the stator section, micro-beams (8, 10) extending from the attachment section, a rotor section (12) supported for swing motion by the micro-beams, a permanent magnet (18) disposed in the stator section, and a coil (4) disposed in the rotor section. Electric current is conducted through the coil in the magnetic field created by the permanent magnet for causing the micro-beams to be displaced for inducing swing motion of the rotor section. The actuator can be assembled to a small size, typically a width of 1-10 mm, a length of 1-10 mm, and a height of 0.1-5 mm.

6 Claims, 7 Drawing Sheets

| | FOREIGN PATENT DOCUMENTS | | |
|----|----|----|----|
| EP | 1091477 A2 | * | 4/2001 |
| JP | 10258253 A | * | 9/1998 |
| JP | 2001340812 A | * | 12/2001 |
| JP | 2002153818 A | * | 5/2002 |
| JP | 2002-200460 A | | 7/2002 |
| JP | 2002200460 A | * | 7/2002 |
| JP | 2003010783 A | * | 1/2003 |

OTHER PUBLICATIONS

Wakiwaka et al, Proceedings of the 25th Annual Conference on Magnetics in Japan, 2001, p. 302.

* cited by examiner

SMALL-SIZE DIRECT-ACTING ACTUATOR

CROSS-REFERENCE TO RELATED APPLICATION

This non-provisional application claims priority under 35 U.S.C. §119(a) on Patent Application No. 2003-408859 filed in Japan on Dec. 8, 2003, the entire contents of which are hereby incorporated by reference.

TECHNICAL FIELD

This invention relates to a small-size direct-acting actuator.

BACKGROUND ART

The recent advance of the semiconductor fabrication technology has made it possible to construct ultra-fine structures of the micrometer order. Triggered by the advanced processing technology, efforts are being made on the research and development of so-called micro-machines. The actuator which is one of elemental devices of the micro-machine is of great concern.

From the movement aspect, the microactuator is generally divided into rotary and direct-acting types. Since the direct-acting type has a very simple structure, most research works address direct-acting actuators. From the driving principle, the microactuator is generally divided into electrostatic, piezoelectric, electromagnetic, shape-memory alloy, photo-drive, and pneumatic drive modes. Of these, the electrostatic mode is most attractive, and the piezoelectric mode next. The electromagnetic mode actuator is considered in itself to be one of most attractive actuators because high efficiency and high output are expected from its principle, and they have been utilized in the prior art motor technology. Nevertheless, there are few research reports relating to direct-acting microactuators of the electromagnetic mode. One main reason is the difficulty of size reduction due to complex structure.

Components of the electromagnetic direct-acting microactuator include a permanent magnet and a coil. With respect to the permanent magnet, magnet materials exhibiting high performance despite small size have been developed by virtue of the advanced thin-film or miniaturization technology. As to the coil, small size coils have been developed as a result of the progress of micro-electromechanical systems utilizing the semiconductor micropatterning technology.

A voice coil motor is one of the linear drive electromagnetic actuators which have been widely used. When a drive system is assembled using a voice coil motor, an operating or rotor section is generally provided with a linear guide for preventing the operating section from deviating from the drive direction. The linear guide has a guide rail and a slider which are movably combined via a bearing. The slider can serve as a rotor. Among linear guides using ball bearings, linear guides having a slider with plane dimensions of at least 3 mm×6 mm are now commercially available. The guide rail used therein has a size which is the sum of the size of the slider, the stroke, and the size of an attachment to a stationary section (stator). Despite a need for driving to the sub-millimeter order, the actuator has a size of 1 cm or larger. A pneumatic bearing is of the design that a rod-shaped slider is movably inserted into an axial through-hole in a quadrangular prism or cylindrical guide rail. This design further increases the size of the actuator since the guide rail should have a sufficient length relative to the diameter of the rod-shaped slider so as to prevent the slider from becoming loose in the guide rail.

As understood from the above discussion, it is concluded that the presence of a relatively large size linear guide in the actuator accounts for the difficulty of size reduction of electromagnetic direct-acting actuators.

The references pertinent to the technology of the present invention include Wakiwaka et al., Journal of the Magnetics Society of Japan, Vol. 24, No. 4-2 (2000), pp. 955-958; and Wakiwaka et al., Proceedings of the 25th Annual Conference on Magnetics in Japan, 2001, p. 302.

SUMMARY OF THE INVENTION

An object of the invention is to provide a direct-acting actuator which has a simple structure and small size in that a rotor is supported for swing motion by micro-beams that undergo elastic deformation only in the drive direction, rather than a linear guide.

According to the invention, there is provided a small-size direct-acting actuator having a width of 1 to 10 mm, a length of 1 to 10 mm, and a height of 0.1 to 5 mm, comprising a stator section, an attachment section secured to the stator section, metallic micro-beams extending from the attachment section and shaped by bending, a rotor section supported for swing motion by the micro-beams, a permanent magnet disposed in the stator or rotor section, and a coil disposed in the rotor or stator section. Electric current is conducted through the coil in the magnetic field created by the permanent magnet for causing the micro-beams to be displaced for inducing swing motion of the rotor section.

In a preferred embodiment, a pair of the micro-beams are disposed at opposite sides of the stator section for supporting the rotor section, and the micro-beams are flexible enough to be displaced by a drive force developed between the stator and rotor sections in a drive direction which is parallel to a plane sandwiched between the pair of micro-beams and perpendicular to the longitudinal direction of the micro-beams, but highly stiff in other directions.

Preferably, each micro-beam includes at least one fold. Also preferably, the micro-beams are formed integrally with the attachment section and the rotor section by punching and bending a metal plate having a gage of 0.025 to 0.5 mm.

Preferably, the stator section is made of a ferromagnetic material. Also preferably, the rotor section is made of a ferromagnetic material.

The actuator may further include an auxiliary yoke opposed to the stator section for forming a magnetic circuit, with the rotor section being interposed between the auxiliary yoke and the stator section.

More specifically, the invention provides a small-size direct-acting actuator having a width of 1 to 10 mm, a length of 1 to 10 mm, and a height of 0.1 to 5 mm, comprising a stator section where a permanent magnet or a coil is disposed, and a member comprising a stator attachment section, micro-beams, and a rotor section where a coil or a permanent magnet is disposed, the permanent magnet and the stator section forming a magnetic circuit, the permanent magnet and the coil being opposed to define a small gap therebetween and within the magnetic circuit, and the micro-beams being juxtaposed and integrally formed at laterally opposed edges of the stator attachment section and stand along the edges at right angles toward the stator section so that the micro-beams are formed by furnishing elongated strips extending forward from the front side of the stator attachment section at opposed edges, folding the strips inside an angle of 180° to form a first fold, then folding the strips inside an angle of 180° at a position backward of the attachment section front side to form a second fold or in the reverse direction to the first fold and provide the last portions of the strips which extend forward again, and the rotor section is integrally formed through transition portions with the last forward extending portions of the strips, wherein when electricity is conducted across the coil in the magnetic field created by the permanent magnet, the rotor section is arcuately moved by Lorentz forces in a latered direction.

In this case, in the actuator, the member including the stator attachment section, micro-beams and rotor section is prepared by furnishing a blank in which the attachment section and the rotor section are bridged at laterally opposed sides by strips, folding inside the strips at a first intermediate point an angle of about 180° so that the rotor section overlies the attachment section, then folding back the strips at a second intermediate point an angle of about 180° so that the rear edge of the rotor section is situated close to the front edge of the attachment section, and finally folding the strips along their longitudinal inner side at right angles toward the stator section.

According to the invention, a direct-acting actuator of a simple structure and small size is available using the electromagnetic mode featuring high efficiency and outputs.

BRIEF DESCRIPTION OF THE DRAWINGS

Throughout the drawings, like parts are designated by the same numerals and their description is omitted in later embodiments.

DESCRIPTION OF THE PREFERRED EMBODIMENTS

Figure 1:
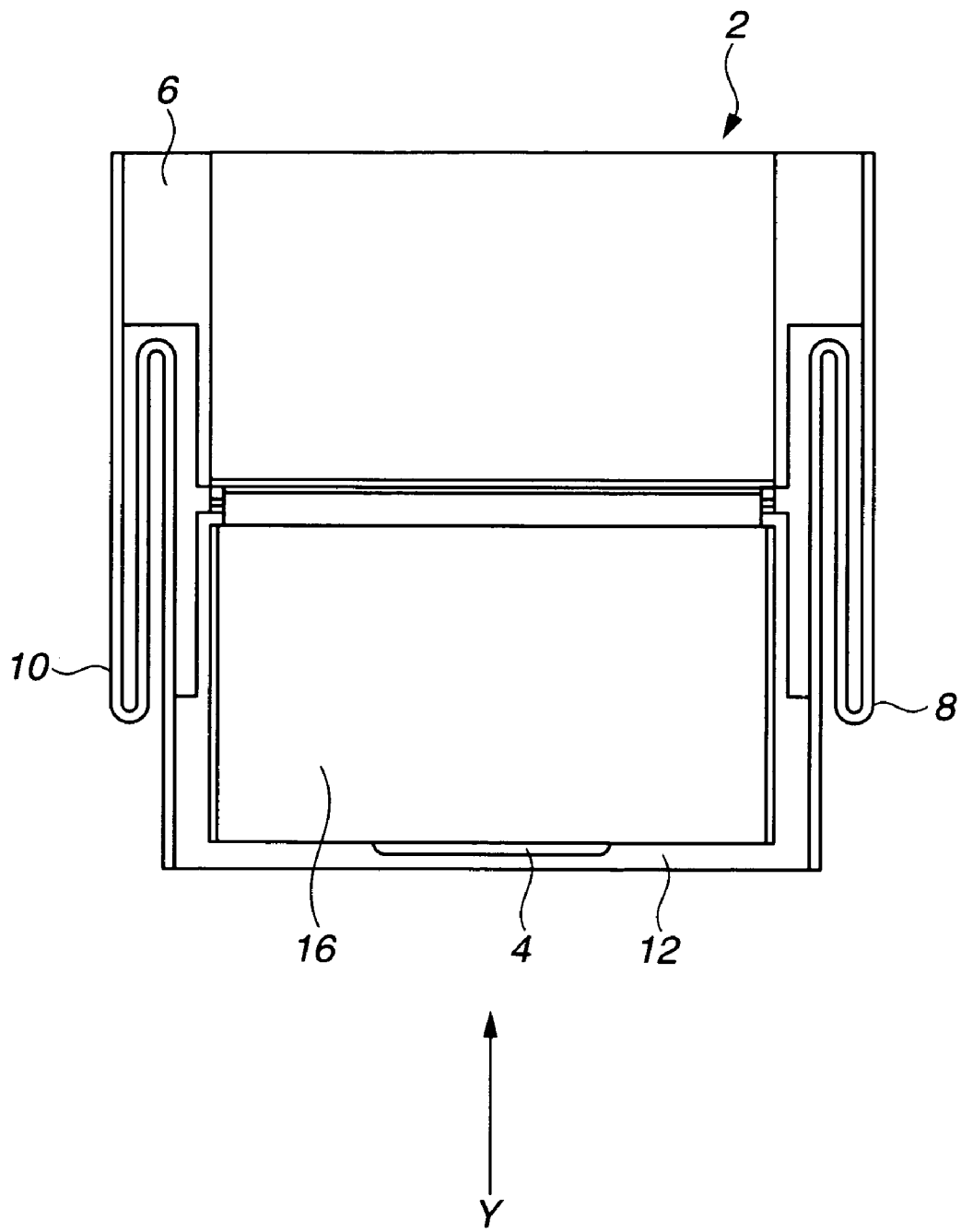
FIG. 1 is a plan view of a direct-acting actuator in a first embodiment of the invention.
Figure 2:
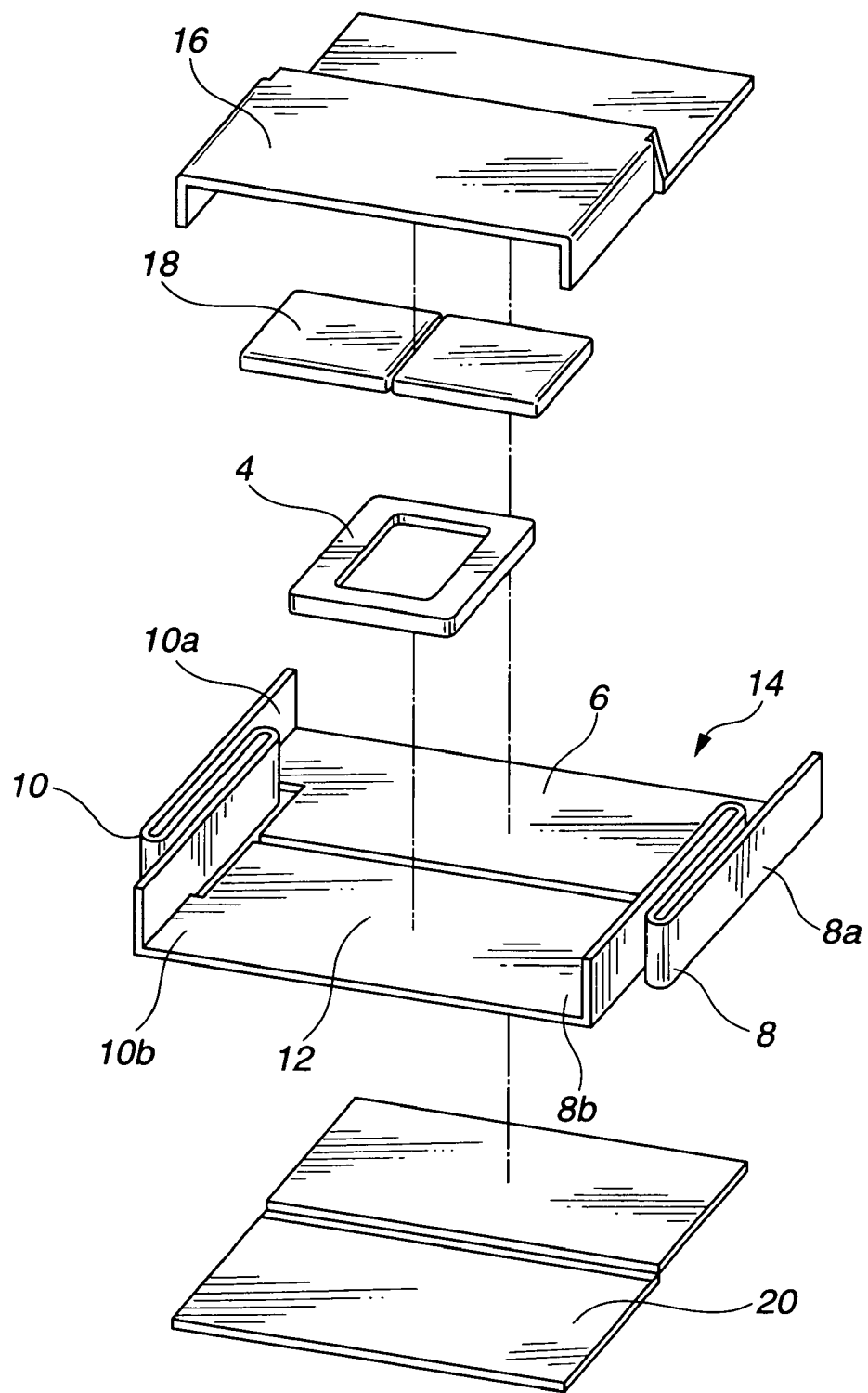
FIG. 2 is a perspective exploded view of the actuator in the first embodiment of the invention.

FIGS. 1 and 2 are plan and perspective exploded views of a direct-acting actuator 2 according to one embodiment of the invention, respectively. For the sake of clarity, wires for supplying electric power to a coil are not shown. The actuator 2 includes a stator section or member 16, a member 14, and an optional yoke 20. The member 14 includes a stator attachment section 6, micro-beams 8, 10, and a rotor section 12. Attached to the rotor section 12 is a coil 4. Disposed in the stator section 16 is a permanent magnet 18. The stator section 16 is preferably made of a ferromagnetic material for helping form a magnetic circuit. The auxiliary yoke 20 made of a ferromagnetic material may be attached, if necessary, for enhancing the efficiency of the magnetic circuit. The member 14 (which includes the stator attachment section 6, the micro-beams 8, 10, and the rotor section 12), the stator section 16, and the auxiliary yoke 20 are assembled and secured to an apparatus that carries the actuator (not shown) by usual joining means such as adhesive bonding or welding. In addition to the coil 4, an object (not shown) to be arcuately moved is mounted to the rotor section 12 by any desired means.

Specifically in the member 14 which includes the stator attachment section 6, the micro-beams 8 and 10, and the rotor section 12, the micro-beams 8 and 10 are juxtaposed and integrally formed at laterally opposed edges of the stator attachment section 6 and stand along the edges at right angles toward the stator section 16. More specifically, as described later in conjunction with FIG. 4, the micro-beams 8 and 10 are formed by furnishing elongated strips 8a, 10a extending forward from the front side of the stator attachment section 6 at opposed edges, folding the strips 8a, 10a inside an angle of 180° to form a first fold, then folding the strips inside an angle of 180° at a position backward of the attachment section front side to form a second fold (in the reverse direction to the first fold) and provide the last portions of the strips 8a, 10a which extend forward again. The rotor section 12 is integrally formed through transition portions 8b, 10b with the last forward extending portions of the strips 8a, 10a.

Figure 3:
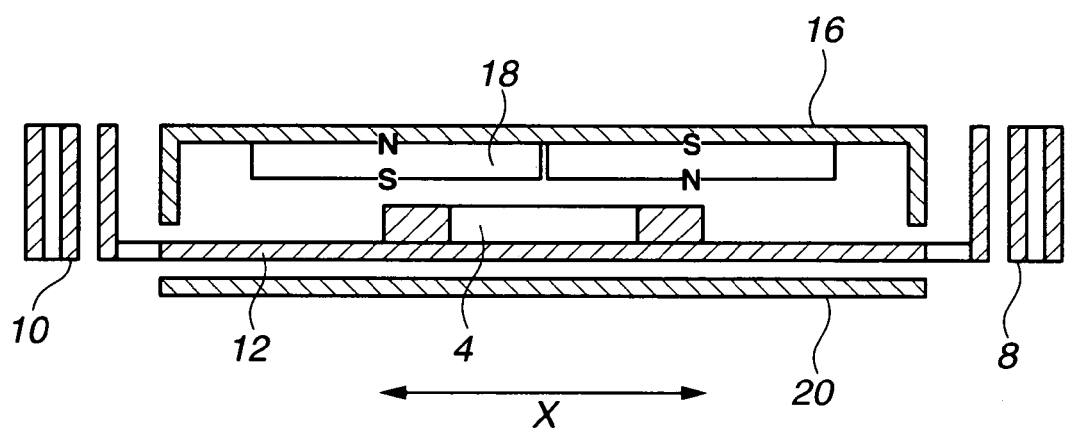
FIG. 3 is a cross-sectional view of the stator and rotor sections in the first embodiment.

In the direct-acting actuator in one embodiment of the invention, in which a magnetic circuit is constructed by the permanent magnet 18, the stator section 16 and the auxiliary yoke 20, the permanent magnet 18 and the coil 4 secured to the rotor section 12 are opposed to maintain a small gap therebetween. As shown in FIG. 3, the permanent magnet 18 is magnetized in a direction perpendicular to the plane of the opposed coil, to provide two magnetic poles which are laterally arranged as viewed in the direction of arrow Y in FIG. 1. Instead, two singularly magnetized permanent magnets may be juxtaposed. The permanent magnet 18 is dimensioned to a magnetic pole area of 0.4 to 10 $mm^2$ and a thickness of 0.1 to 1 mm in the magnetizing direction. The permanent magnet 18 creates magnetic forces which largely affect the drive force of the direct-acting actuator 2 of the invention. To produce sufficient magnetic forces with the above-described dimensions, the use of high strength rare earth magnets, typically Nd—Fe—B sintered magnets is preferred.

The stator section 16 and the auxiliary yoke 20 are made of a ferromagnetic material such as steel and have a gage of about 0.05 to 0.25 mm. The permanent magnet 18 is secured to the stator section 16 by bonding with an epoxy adhesive, soldering, welding or the like.

The coil 4 is made using a copper wire or a printed wiring board. The coil 4 is wound so as to generate at its center a magnetic field perpendicular to the magnetic pole plane of the opposed permanent magnet 18. When the printed wiring board is used, a multilayer wiring board may be used depending on the necessary magnetic force or drive force. The coil 4 is secured to the rotor section 12 using an epoxy adhesive or the like. Power supply lines (not shown) to the coil 4 are secured to the stator attachment section 6 and the like while it is kept loose so as not to interfere with swing motion of the direct-acting actuator.

The member 14 including the stator attachment section 6, micro-beams 8, 10 and rotor section 12 is made of a steel-base flat spring and has a gage of about 0.025 to 0.3 mm. It is preferable to use non-ferromagnetic steel for the purpose of not disturbing the magnetic fields produced by the magnetic circuit (16, 18, 20) and the coil 4.

As best shown in FIG. 2, a pair of micro-beams 8, 10 are extended from the stator attachment section 6 toward the rotor section 12, once folded back toward the stator attachment section 6, and folded again toward the rotor section 12 where they support the rotor section 12. This double-folded structure exerts the same effect as the arrangement of three beams on each side, that is, provides increased resilience in the drive direction of the direct-acting actuator and maintains high stiffness against back and forth motion in a vertical direction, as compared with a single beam. To obtain predetermined resilience and translation stiffness, the number of folds may be only one or three or more.

As shown in FIG. 3, the drive of the direct-acting actuator of the invention is of the same basic structure as ordinary voice coil motors. By conducting electricity across the coil 4 in the magnetic field created by the permanent magnet 18, the rotor section 12 is arcuately moved by Lorentz forces in the direction of arrow X.

Figure 4A:
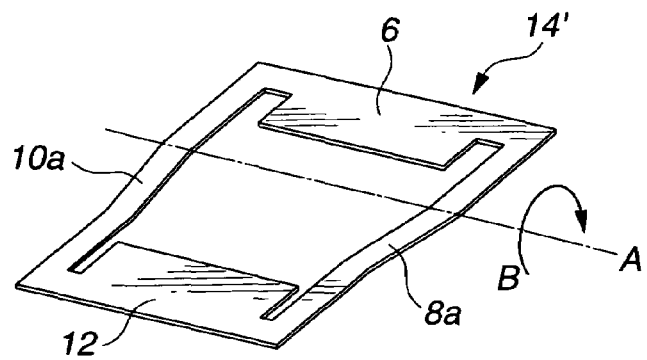
FIG. 4 illustrates the process of working a blank into a member including a stator attachment section, micro-beams and a rotor section.
Figure 4B:
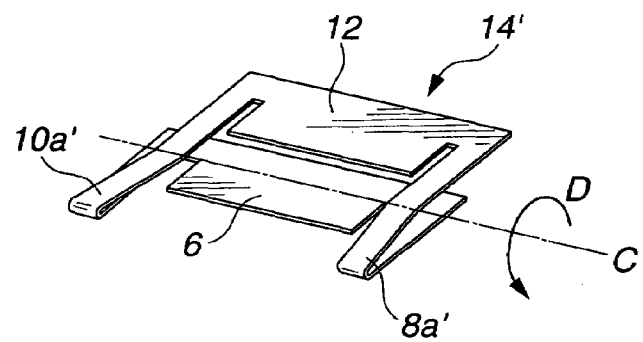
Figure 4C:
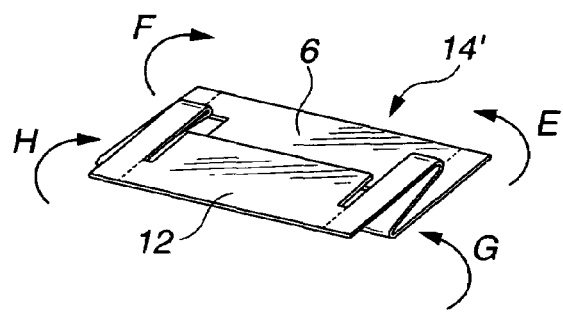
Figure 4D:
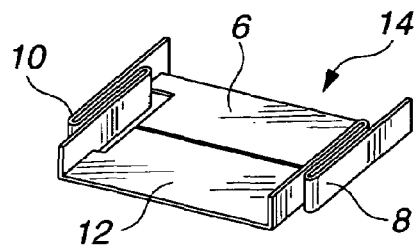

The micro-beams 8, 10 are prepared by punching out a thin blank by pressing or etching, followed by bending. FIG. 4 illustrates the working and shaping process. The member 14 including the stator attachment section 6, micro-beams 8, 10 and rotor section 12 is prepared by first punching a configured blank 14' out of a thin plate by pressing or etching, the blank 14' being configured such that the stator attachment section 6 and the rotor section 12 are bridged or connected at laterally opposed sides by side strips 8a, 10a as shown in FIG. 4a. The side strips 8a, 10a at first intermediate points depicted by line A are folded an angle of about 180° as shown by arrow B, so that the rotor section 12 overlies the attachment section 6 as shown in FIG. 4b. Then the side strips 8a', 10a' at second intermediate points depicted by line C are folded back an angle of about 180° as shown by arrow D, so that the rear or inside edge of the rotor section 12 is situated close to the front or inside edge of the attachment section 6 as shown in FIG. 4c. Finally, the side strips 8a, 10a are folded along their longitudinal inner side at right angles as shown by arrows E, F, G and H in FIG. 4c, completing the member 14 as shown in FIG. 4d.

The order of folding is not limited to the above embodiment. The side strips may be previously provided with notches at fold lines to facilitate successive working steps.

Also the stator section 16 and the auxiliary yoke 20 are prepared by punching out a thin blank by pressing or etching, followed by bending.

Figure 5:
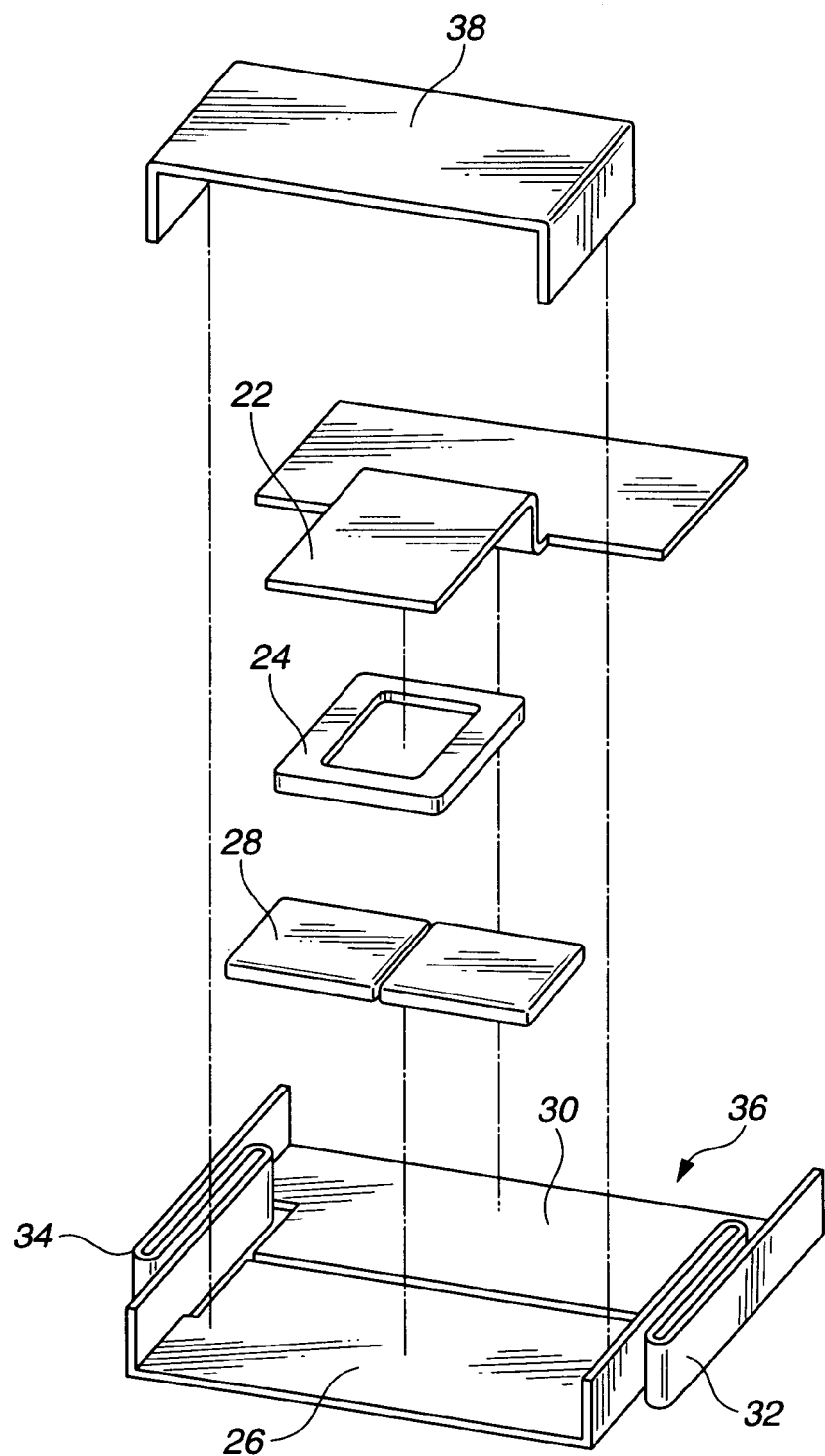
FIG. 5 is a perspective exploded view of a direct-acting actuator in a second embodiment of the invention.

FIG. 5 is a perspective exploded view of the direct-acting actuator according to a second embodiment of the invention. In the second embodiment, a coil 24 is disposed in a stator section 22, and a permanent magnet 28 is disposed in a rotor section 26. Since the coil 24 from which a power supply wire extends is placed in the stator section 22 which is stationary, the wiring is simplified. In the second embodiment, a member 36 including a stator attachment section 30, micro-beams 32, 34 and a rotor section 26 is made of a ferromagnetic material for increasing the efficiency of the magnetic circuit. Alternatively, a plate yoke (not shown) made of a ferromagnetic material may be disposed between the permanent magnet 28 and the rotor section 26. In a preferred embodiment, an auxiliary yoke 38 is mounted to the rotor section 26 so as to enclose the stator section 22, coil 24 and permanent magnet 28.

Figure 6:
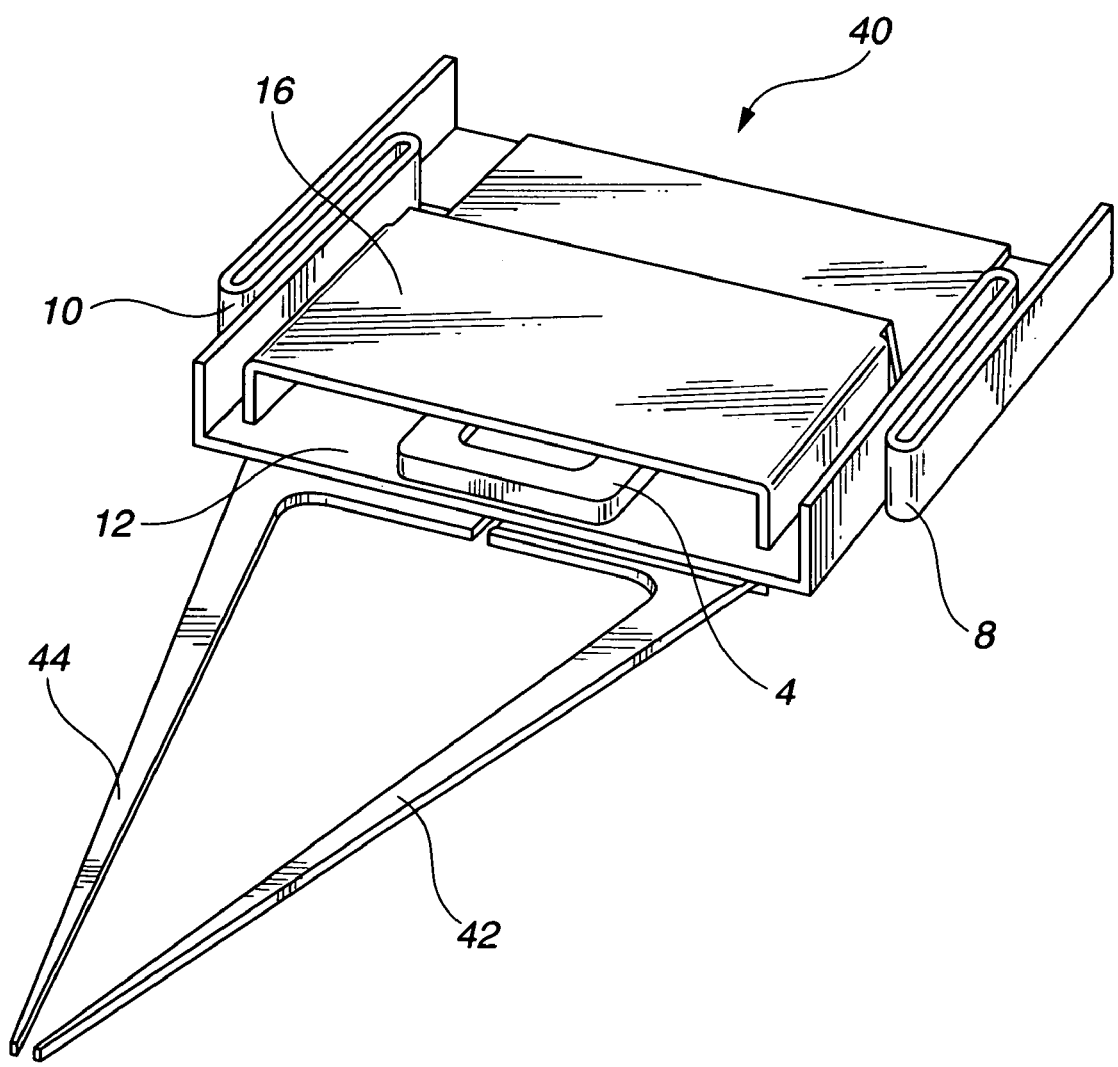
FIG. 6 is a perspective view of a manipulator using a direct-acting actuator according to the invention.
Figure 7:
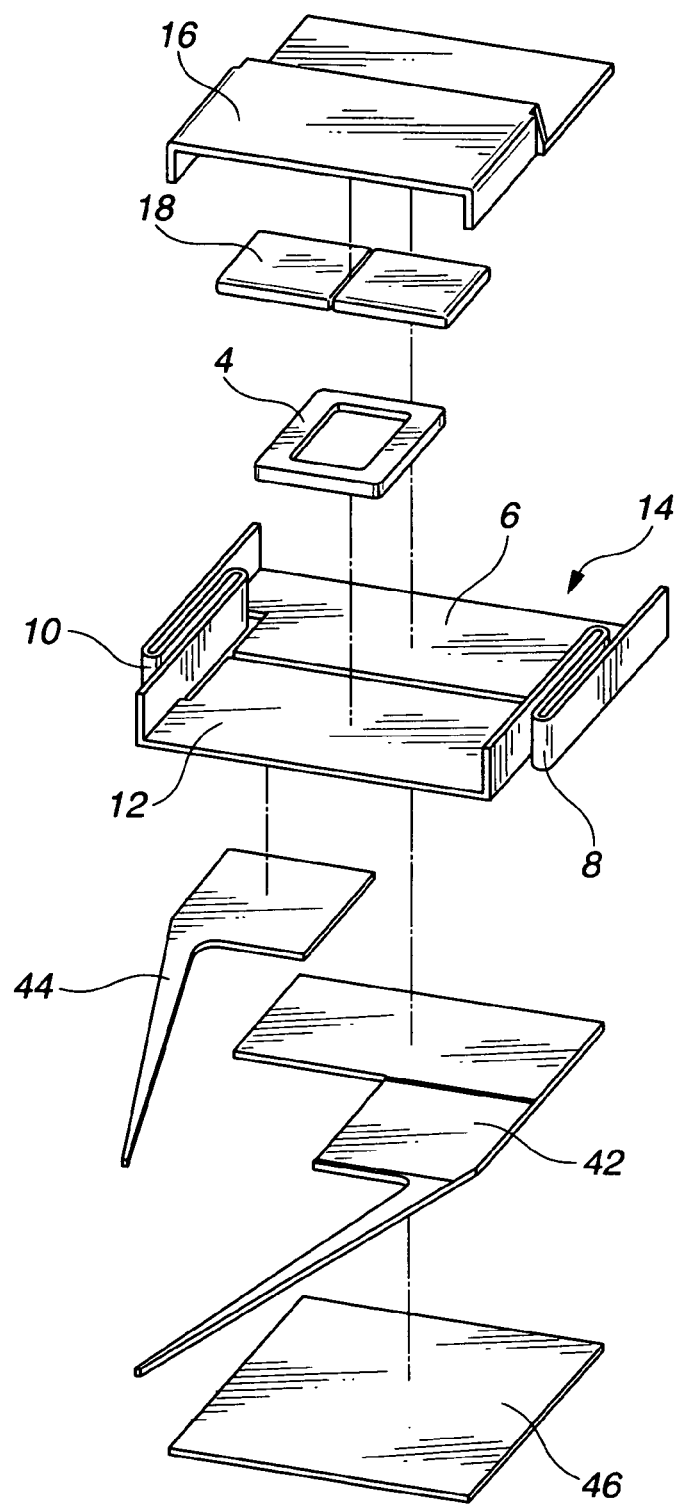
FIG. 7 is a perspective exploded view of the manipulator of FIG. 6.

FIG. 6 is a perspective view of an electromagnetic manipulator to which the inventive actuator is applied, and FIG. 7 is a perspective exploded view of the manipulator. The electromagnetic manipulator 40 includes a pair of hands 42, 44 and a direct-acting actuator. One hand 42 is secured to the stator attachment section 6. The second hand 44 is secured to the rotor section 12. Only the second hand 44 can be moved arcuately to clamp an object of 0.2 mm or less between the hands. The manipulator in the illustrated embodiment is dimensioned to a length of 13 mm, a width of 6 mm and a height of 1 mm, which is only a fraction of prior art known piezoelectric and photo-drive manipulators, for example, having a length of 45 mm, a width of 32 mm and a height of 10 mm.

Japanese Patent Application No. 2003-408859 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A small-size direct-acting actuator having a width of 1 to 10 mm, a length of 1 to 10 mm, and a height of 0.1 to 5 mm, comprising:

a stator section;

a stator attachment section secured to the stator section;

metallic micro-beams extending from the stator attachment section and shaped by bending;

a rotor section supported for swing motion by the micro-beams;

a permanent magnet disposed in the stator or rotor section; and a coil disposed in the rotor or stator section, wherein a member including the stator attachment section, micro-beams, and rotor section is formed by a method comprising the steps of:

preparing a member including a part to be the stator attachment section, a part to be the micro-beams, and a part to be the rotor section by punching a configured blank out of a thin plate by pressing or etching, the blank being configured such that the part to be the stator attachment section and the part to be the rotor section are bridged or connected at laterally opposed sides by side strips to be the micro-beams:

folding the side strips at intermediate points at an angle of about 180° so that the part to be the rotor section overlies the part to be the stator attachment section;

then folding back the side strips at intermediate points an angle of about 180° so that a rear or inside edge of the part to be the rotor section is situated close to a front or inside edge of the part to be the stator attachment section, and subsequently;

folding the side strips along their longitudinal inner side at right angles so as to form the micro-beams;

whereby a pair of the micro-beams is extended from the stator attachment section toward the rotor section, once folded back toward the stator attachment section, and folded again toward the rotor section so as to support the rotor section, and the micro-beams are flexible enough to be displaced by a drive force developed between the stator and rotor sections in a drive direction which is parallel to a plane sandwiched between the pair of micro-beams and perpendicular to a longitudinal direction of the micro-beams, but highly stiff in other directions, and wherein electric current is conducted through the coil in the magnetic field created by the permanent magnet for causing the micro-beams to be displaced for inducing swing motion of the rotor section.

2. A small-size direct-acting actuator having a width of 1 to 10 mm, a length of 1 to 10 mm, and a height of 0.1 to 5 mm, comprising
a stator section where a permanent magnet or a coil is disposed, and
a member comprising a stator attachment section, micro-beams, and a rotor section where a coil or a permanent magnet is disposed,
the permanent magnet and the stator section forming a magnetic circuit, the permanent magnet and the coil being opposed to define a small gap therebetween and within the magnetic circuit,
wherein the member is formed by a method comprising the steps of:
preparing a member including a part to be the stator attachment section, a part to be the micro-beams, and a part to be the rotor section by punching a configured blank out of a thin plate by pressing or etching, the blank being configured such that the part to be the stator attachment section and the part to be the rotor section are bridged or connected at laterally opposed sides by side strips to be the micro-beams;
folding the side strips at intermediate points at an angle of about 180° so that the part to be the rotor section overlies the part to be the stator attachment section;
then folding back the side strips at intermediate points an angle of about 180° so that a rear or inside edge of the part to be the rotor section is situated close to a front or inside edge of the part to be the stator attachment section, and subsequently;
folding the side strips along their longitudinal inner side at right angles so as to form the micro-beams;
whereby a pair of the micro-beams is extended from the stator attachment section toward the rotor section, once folded back toward the stator attachment section, and folded again toward the rotor section so as to support the rotor section, and the micro-beams are flexible enough to be displaced by a drive force developed between the stator and rotor sections in a drive direction which is parallel to a plane sandwiched between the pair of micro-beams and perpendicular to a longitudinal direction of the micro-beams, but highly stiff in other directions, and
wherein when electricity is conducted across the coil in the magnetic field created by the permanent magnet, the rotor section is arcuately moved by Lorentz forces in a latered direction.

3. The actuator of claim 1, wherein said micro-beams are formed integrally with the attachment section and the rotor section by punching and bending a metal plate having a gage of 0.025 to 0.5 mm.

4. The actuator of claims 1 or 2, wherein said stator section is made of a ferromagnetic material.

5. The actuator of claims 1 or 2, wherein said rotor section is made of a ferromagnetic material.

6. The actuator of claim 1, further comprising an auxiliary yoke opposed to said stator section for forming a magnetic circuit, with said rotor section being interposed between the auxiliary yoke and said stator section.

* * * * *